United States Patent
Langtry

(10) Patent No.: US 11,946,547 B2
(45) Date of Patent: Apr. 2, 2024

(54) METAL SEALING RING AND METHOD OF FORMING A METAL-TO-METAL SEAL

(71) Applicant: Tokamak Energy Ltd, Abingdon (GB)

(72) Inventor: Anthony Vivian Langtry, Abingdon (GB)

(73) Assignee: Tokamak Energy Ltd., Abingdon (GB)

( * ) Notice: Subject to any disclaimer, the term of this patent is extended or adjusted under 35 U.S.C. 154(b) by 187 days.

(21) Appl. No.: 17/620,315

(22) PCT Filed: Jun. 18, 2020

(86) PCT No.: PCT/EP2020/067051
§ 371 (c)(1),
(2) Date: Dec. 17, 2021

(87) PCT Pub. No.: WO2020/254543
PCT Pub. Date: Dec. 24, 2020

(65) Prior Publication Data
US 2022/0243816 A1    Aug. 4, 2022

(30) Foreign Application Priority Data

Jun. 19, 2019    (GB) ..................................... 1908783

(51) Int. Cl.
*F16J 15/08*    (2006.01)
*F16J 15/46*    (2006.01)
(Continued)

(52) U.S. Cl.
CPC ....... *F16J 15/0881* (2013.01); *F16J 15/0893* (2013.01); *F16J 15/46* (2013.01); *G21B 1/057* (2013.01); *G21B 1/17* (2013.01)

(58) Field of Classification Search
CPC ........ F16J 15/068; F16J 15/08; F16J 15/0881; F16J 15/0893; F16J 15/46; F16L 17/10; F16L 23/02
See application file for complete search history.

(56) References Cited

U.S. PATENT DOCUMENTS 3,147,016 A  *  9/1964  Traufler .................. F16J 15/46
                                                         277/614
3,352,446 A       9/1965  Anderson et al.
(Continued)

FOREIGN PATENT DOCUMENTS

FR    2688484 A1    9/1993
GB    191513012 A    9/1916
(Continued)

OTHER PUBLICATIONS

International Search Report and Written Opinion for Application No. PCT/EP2020/067051 dated Oct. 5, 2020 (14 bages).
(Continued)

*Primary Examiner* — Nicholas L Foster
(74) *Attorney, Agent, or Firm* — Michael Best & Friedrich LLP

(57) ABSTRACT

A metal sealing ring (1) for forming a metal-to-metal seal between two opposing metal surfaces. The metal sealing ring (1) comprises a tubular metal body (3) and an inlet tube (7) extending from the body (3) for introducing an internal pressure into the body (3). The body is adapted to deform under the internal pressure against each of the opposing metal surfaces to form the seal (1).

15 Claims, 4 Drawing Sheets

(51) Int. Cl.
*G21B 1/05* (2006.01)
*G21B 1/17* (2006.01)

(56) References Cited

U.S. PATENT DOCUMENTS

| | | | |
|---|---|---|---|
| 3,643,965 A | 2/1972 | Nicholson | |
| 3,903,931 A * | 9/1975 | Moulin | F16J 15/46 |
| | | | D12/608 |
| 4,624,465 A | 11/1986 | Rogemont | |
| 4,850,521 A * | 7/1989 | Servant | F16L 23/20 |
| | | | 277/614 |
| 4,948,153 A | 8/1990 | Takahashi et al. | |
| 5,265,563 A * | 11/1993 | Kubis | F16J 15/08 |
| | | | 123/41.83 |
| 5,944,319 A | 8/1999 | Kohlman | |
| 6,588,768 B1 * | 7/2003 | Janich | F16J 15/0893 |
| | | | 277/637 |
| 7,503,594 B2 * | 3/2009 | Peacock | F16L 55/10 |
| | | | 137/67 |
| 2002/0130473 A1 * | 9/2002 | Doyle | F16L 17/08 |
| | | | 277/612 |
| 2002/0153669 A1 * | 10/2002 | Caplain | F16J 15/0893 |
| | | | 277/606 |
| 2005/0052025 A1 * | 3/2005 | Peacock | F16K 31/002 |
| | | | 285/381.1 |
| 2005/0206097 A1 * | 9/2005 | Datta | F16J 15/0893 |
| | | | 277/644 |
| 2013/0193650 A1 * | 8/2013 | Tohdoh | F16J 15/0887 |
| | | | 277/590 |
| 2015/0159755 A1 * | 6/2015 | Whitlow | F16J 15/104 |
| | | | 277/611 |
| 2015/0300495 A1 * | 10/2015 | Vu | F16J 15/0806 |
| | | | 277/608 |
| 2020/0080639 A1 * | 3/2020 | Nachlas | F16J 15/12 |

FOREIGN PATENT DOCUMENTS

| | | |
|---|---|---|
| GB | 2510447 A | 8/2014 |
| JP | S60183889 U | 12/1995 |

OTHER PUBLICATIONS

United Kingdom Intellectual Property Office Search Report for Application No. 1908783.2 dated Oct. 22, 2019 (3 pages).

* cited by examiner

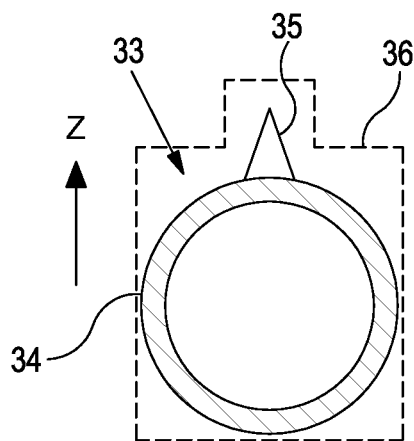 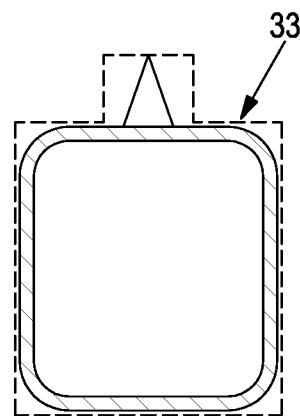
Figure 5A    Figure 5B
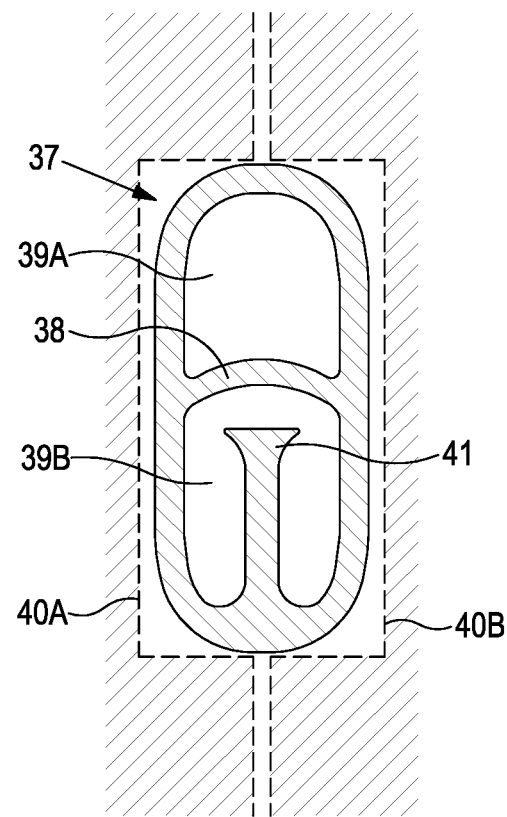 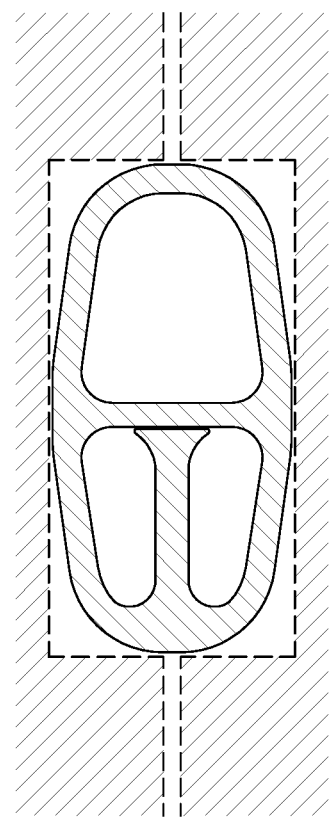
Figure 6A    Figure 6B

METAL SEALING RING AND METHOD OF FORMING A METAL-TO-METAL SEAL

CROSS-REFERENCE TO RELATED APPLICATION(S)

This application is a national phase entry of PCT/EP2020/067051, filed on Jun. 18, 2020, which claims priority to GB 1908783.2, filed on Jun. 19, 2019, the entire contents of each of which are fully incorporated herein by reference.

TECHNICAL FIELD

The present invention relates to a metal sealing ring and a method of forming a meta-to-metal seal. In particular, but not exclusively, the present invention relates to a metal sealing ring for use in sealing a vacuum chamber, such as a vacuum chamber in a tokamak fusion reactor, or a piston engine.

BACKGROUND

Metal sealing rings are often used to provide a gas- or liquid-tight seal between two metal surfaces, such as between the flanged ports of two vacuum chambers which are being joined together. In some applications, the metal sealing ring is a flat, circular metal gasket made of a relatively soft metal such as a copper or aluminium, which is crushed between the metal surfaces, which are generally made of a harder metal, such as stainless steel. The metal surfaces or "conflat flanges" are each provided with a circular ridge or "knife-edge" which bites into a respective face of the gasket causing the metal of the gasket to be extruded around the knife-edges and thereby form a seal between the two metal surfaces.

Whilst conflat flanges and metal gaskets can be used to form very good seals, for example in ultrahigh vacuum systems, they suffer from a number of drawbacks, including the need for careful alignment ("mating") of the flanges with the metal gasket and high clamping forces. The quality of the seal may also be severely reduced if the compression load on the gasket is uneven or too high.

Another type of metal sealing ring is a so-called Wills ring, which is an O-ring formed from a metal tube. In use, the Wills ring is compressed between two flanges so that its cross section is deformed against the surfaces of the flanges to form a seal. Some versions of the Wills ring are pressurised in order to increase their resiliency. Another type of sealing ring, marketed under the name Helicoflex®, comprises a tubular metal ring with a C-shaped cross section and a helical spring inserted inside the metal ring to increase its elasticity. However, these types of metal sealing ring also require a relatively precise fit and careful control of the clamping forces in order to get an even seal and to avoid damage to the sealing ring.

SUMMARY

It is an object of the present invention to provide a metal sealing ring which addresses, or at least alleviates, the problems described above.

According to a first aspect of the present invention, there is provided a metal sealing ring for forming a metal-to-metal seal between two opposing metal surfaces. The metal sealing ring comprises a tubular metal body and an inlet tube extending from the body for introducing an internal pressure into the body. The body is adapted to deform under the internal pressure against each of the opposing metal surfaces to form the seal.

The body may have a cross section (e.g. a radial cross section) comprising two or more sections made of different respective metals, each metal having a different ductility and/or yield strength.

The body may have a cross section (e.g. a radial cross section) comprising two or more sections having different respective thicknesses.

The two or more sections may be arranged to cause the cross section of the body to expand preferentially along an axial direction upon introduction of the internal pressure into the body.

The body may comprise one or more ridges extending around the ring for forming a knife-edge seal with one or more of the metal surfaces upon introduction of the internal pressure into the body.

The body may comprise an exterior layer of a ductile metal such as indium.

The body may be wholly or partially filled with a hydraulic medium. The hydraulic medium may be silicone rubber.

The body may comprise walls having a thickness from 0.1 mm to 10 mm, or preferably from 0.2 mm to 2 mm.

The body may be adapted to increase in volume by at least 5% upon introduction of an internal pressure exceeding the ambient pressure by no more than 300 MPa, preferably by no more than 150 MPa.

The body may be adapted to increase in volume by deforming plastically upon introduction of the internal pressure. The plastic deformation allows the internal pressure in the body to be relieved without breaking the seal.

The inlet tube may be sealed such that body and the inlet tube together form a closed system, whereby reducing the interior volume of the inlet tube introduces an internal pressure into the body. The metal sealing ring may comprise a piston surface movable within the interior volume of the inlet tube to introduce an internal pressure into the body. The piston surface may be provided by or movable using a screw.

The metal sealing ring may comprise a piston chamber for maintaining the internal pressure in the body, the piston chamber being in fluid communication with the body and/or inlet tube and comprising a piston configured to compress a hydraulic medium within the body.

The tubular metal body may be toroidal.

The interior of the body may be divided into first and second chambers by a dividing wall, the dividing wall being configured to, in response to an internal pressure introduced into the first chamber using the inlet tube, move towards the second chamber and cause expansion of the body against each of the opposing metal surfaces. The second chamber may comprise a strut configured to oppose the movement of the dividing wall, preferably the strut being elastically compressible to provide an elastic restoring force on the dividing wall.

The inlet tube may extend from an outer peripheral wall of the tubular metal body, i.e. a wall defining an outer perimeter of the ring formed by the tubular metal body. For example, if the tubular metal body has an axis of revolution (e.g. if the tubular metal body is toroidal) then the inlet tube may extend from an outer peripheral wall of the tubular body such that the tubular body is closer to the axis than the inlet tube. In particular, the inlet tube may extend outwards from the tubular body and away from the axis along a radial direction, i.e. a direction that is perpendicular to the axis and perpendicular to the outer peripheral wall of the tubular body.

According to a second aspect of the present invention, there is provided a seal between two opposing metal surfaces. The seal comprises a metal sealing ring as described above. The metal sealing ring is at least partially located within a channel formed in at least one of the metal surfaces.

According to a third aspect of the present invention there is provided a vacuum chamber comprising two opposing metal surfaces sealed to one another using a metal sealing ring as described above (or the seal as described above in the second aspect). The inlet tube of the metal sealing ring may extend outside the vacuum chamber through a channel in at least one of the opposing metal surfaces.

According to a fourth aspect of the present invention there is provided a piston engine comprising an engine block and a cylinder head sealed to the engine block using a head gasket comprising a metal sealing ring as described above (or the seal as described above in the second aspect).

According to a fifth aspect of the present invention there is provided a kit comprising a metal sealing ring as described above, a hydraulic pump, preferably a hydraulic hand pump, and a connector for connecting the inlet tube of the metal sealing ring to the hydraulic pump.

According to a sixth aspect of the present invention, there is provided a tokamak comprising a vacuum chamber having a toroidal interior volume. The vacuum chamber comprises a plurality of segments, each segment providing a sector of the toroidal interior volume and comprising one or more toroidal field coils wound around the segment for generating a toroidal magnetic field within the sector. The vacuum chamber further comprises a seal formed between at least two of the segments using a metal sealing ring as described above (or the seal as described above in the second aspect).

Each segment may be individually removable from the vacuum chamber, i.e. each segment may be removed from the vacuum chamber without requiring removal or movement of the other segments. The plurality of segments may comprise 12 or more segments, preferably 16 segments.

According to a seventh aspect of the present invention, there is provided a vacuum system comprising an outer vacuum chamber enclosing a tokamak as described above. The outer vacuum chamber is connected to another vacuum chamber into which one or more of the segments of the vacuum chamber of the tokamak can be moved.

According to an eighth aspect of the present invention, there is provided a method of forming a metal-to-metal seal between two opposing metal surfaces using a metal sealing ring as described above. The method comprises locating the body of the metal sealing ring between the metal surfaces and using the inlet tube to introduce an internal pressure into the body to deform the body against the metal surfaces to form the seal.

The internal pressure may be introduced into the body by forcing a fluid, such as a hydraulic fluid, into the body from the inlet tube. Forcing the fluid into the body from the inlet tube may comprise crimping the inlet tube. The body may be plastically deformed such the internal pressure in the body can be relieved without breaking the seal.

According to a further aspect of the present invention there is provided a piston comprising a metal sealing ring according to any of the aspects described above.

According to a yet further aspect of the present invention there is provided a plasma compression device comprising a chamber and one or more pistons according to the further aspect above. The pistons are in fluid communication with the chamber and the device is configurable to allow compression of a plasma within the chamber using the piston(s).

BRIEF DESCRIPTION OF THE DRAWINGS

FIGS. 5A and 5B schematic cross section views of the body of a metal sealing ring before and after inflation;

FIGS. 6A and 6B are schematic cross section views of the body of a metal sealing ring before and after inflation.

DETAILED DESCRIPTION

Figure 1:
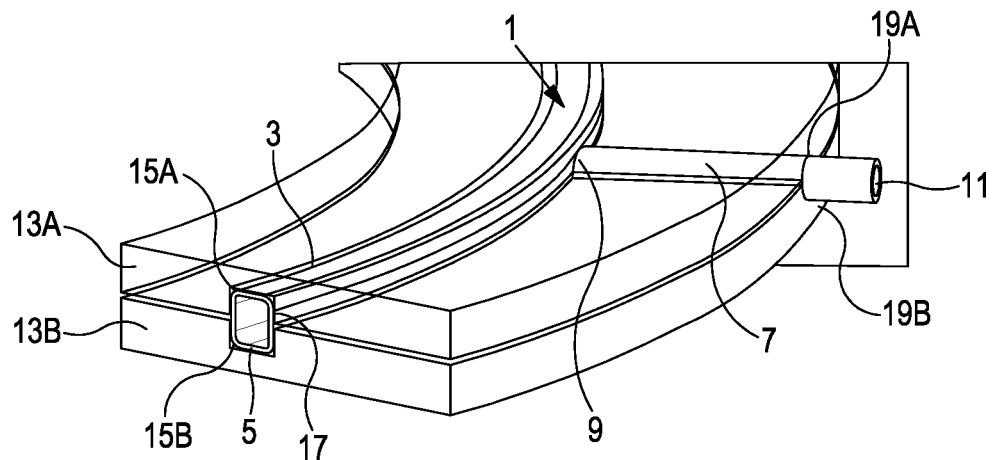
FIG. 1 is a schematic perspective section view of a metal sealing ring in use to provide a seal between two flanges.

FIG. 1 shows a section of a metal sealing ring 1 comprising a body 3 formed of a hollow metal tube with a cross section 5. Although the figure shows only a segment of the ring 1, the body 3 extends around in a circle to form a torus. The metal sealing ring 1 also comprises an inlet tube 7 which extends radially outwards from the outer wall of the body 5 and is joined to the body by a "T" joint 7. In this example, the end 11 of the inlet tube 7 is not sealed, although as described below, in some cases it may be sealed to maintain the internal pressure within the metal sealing ring 1.

The metal sealing ring 1 is located between a pair of mated, circular metal flanges 13A, B. In this example, each of the flanges 13A-B has one of a pair of complementary circumferential grooves or channels 15A-B, which together accommodate the body 3 of the metal sealing ring 1. As described below, the cross section 5 of the body 3 of the metal sealing ring 1 is adapted to largely conform to the cross section 17 formed by the channels 15A-B in order to form a seal between the adjoining interior faces of the flanges 13A-B. In this example, the channel cross section 17 and the cross section 5 of the body 3 are square or rectangular, but other shapes can also be used. In some applications it is beneficial to provide a groove or channel 15A-B in only one of the two metal flanges as this can allow the flanges to be slid into position relative to each other (whilst the sealing ring is disposed in the channel). Such an approach is particularly useful when there are geometric constraints which hinder or preclude the flanges being brought together in an axial direction, i.e. along the axis of the sealing ring. An example of such constraints is discussed below in connection with FIGS. 6 and 7.

The inlet tube 7 of the metal sealing ring 1 is accommodated by a pair of complementary channels extending radially through the flanges 13A-B from the circumferential channels 13A, B to allow the end 11 of the inlet tube 7 to protrude through the radially outermost edges of the flanges 13A-B. The cross section of the radial channels 19A-B can be of any shape, although it is preferred that the shape conforms to the inlet tube 11 to hold the inlet tube 11 securely in place, which helps avoid placing stress on the joint 9 and prevents the inlet tube 7 from being deformed.

Figure 2:
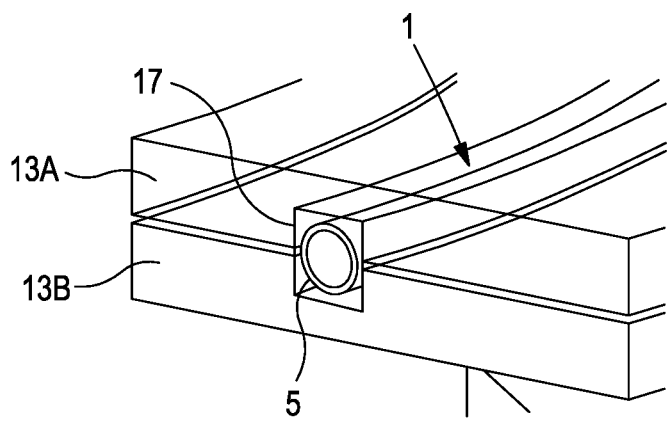
FIG. 2 is a schematic perspective section view of the metal sealing ring of FIG. 1 prior to forming the seal.

FIG. 2 shows a segment of the metal sealing ring 1 prior to forming the seal between the flanges 13A-B. The cross section 5 of the body 3 of the metal sealing ring 1 is initially circular, as shown in FIG. 2, and smaller than the channel cross section 17, allowing the body 3 to be easily inserted into one of the channels 15A-B before the flanges 13A-B are mated. The seal is formed by using the inlet tube 7 to introduce an internal pressure into the body 3 of the metal sealing ring 1, which deforms (e.g. inflates) the cross section 5 of the body 3 against the walls of the channels 15A-B, i.e. the outer surface of the body 3 is forced into contact with the walls of the channels 15A-B all the way around the circumference of the sealing ring 1.

The body 3 may undergo plastic deformation, depending on the properties of the metals and alloys used to form the body 3, and the extent of the deformation, i.e. the deformation may be essentially irreversible once the internal pressure in the body 3 is relieved. This process shares some similarities with a manufacturing method known as hydroforming, in which a tube is inserted between a pair of moulds (dies) and expanded using high-pressure water to produce a shape which conforms to the opposing faces of the moulds. In this case, maintaining the internal pressure in the body 3 may not be necessary. However, in many cases it may be preferable to keep the body 3 "inflated", at least to some extent, as this improves the seal strength and prevents the mechanical forces, such as vibrations, from further deforming the body 3. Advantageously, the metal sealing ring 1 can be made with relatively broad manufacturing tolerances because, unlike some conventional sealing rings, it is able to adapt during inflation to the shape of the channels 15A-B, i.e. it is not required to conform precisely to the channels 15A-B prior to sealing.

Alternatively, the body 3 may be deformed elastically such that the metal sealing ring 1 substantially regains its initial form once the internal pressure in the body 3 is relieved. In some cases, this allows the metal sealing ring 1 to be re-used and/or for the leak rate of the seal to be adjusted, e.g. to allow the controlled introduction of gas into a vacuum chamber (such as occurs during venting).

The metal sealing ring 1 is preferably made of a ductile metal such as copper or aluminium, which reduces the internal pressure needed to deform the cross section 5 of the body 3. It is also preferable that the walls of the body 3 are relatively thin for the same reason. However, the thickness of the walls will, in general, depend on the size of the seal. For example, in some applications, such as a large tokamak (see below), which may require large sealing rings, the thickness of the walls of the body 3 may be from 1 mm to 10 mm or from 2 mm to 5 mm. In other applications, such as those involving a relatively small vacuum chamber, the walls of the body 3 may be from 0.1 mm to 1 mm or from 0.2 mm to 0.5 mm. Some or all of the outer surface of the metal sealing ring 1 may be coated with a layer of a softer metal, such as indium, in order to form a sealing surface of the metal sealing ring 1 which better conforms to the surfaces of the flanges 13 A-B.

The internal pressure may be introduced into the body 3 in a number of ways. For example, a pneumatic pump may be used to force compressed gas though the inlet tube 7 into the body 3. Alternatively, a hydraulic press or pump, such as a hydraulic hand pump, may be used to force a hydraulic medium, such as water, oil or silicone rubber, into the body 3. The end 11 of the inlet tube 7 may be adapted to connect to a pump and/or press, e.g. by providing a screw thread on its exterior or interior surface. The inlet tube 7 may also be fitted with a piston which can be used to compress a fluid within the metal sealing ring 1. In one example, the piston is formed by a screw, such as a grub screw, threaded into the end 11 of the inlet tube 7 such that advancing the screw into the inlet tube 7 raises the internal pressure in the ring 1.

Alternatively or additionally, the internal pressure may also be created by sealing the end 11 of the inlet tube 7 and compressing at least a portion of the inlet tube 7, e.g. crimping the inlet tube 7 to force fluid (e.g. air) into the body 3. The internal pressure may also be created by introducing a liquid or solid, such as liquid nitrogen or solid carbon dioxide, into the inlet tube 7, sealing the inlet tube 7 and then allowing or causing the liquid or solid to vaporise (or sublime).

In some examples, a sealed auxiliary chamber may be provided, which is in fluid communication with the sealing ring 1 and/or the inlet tube 7 and which serves as a hydraulic pressure accumulator for maintaining the internal pressure in the ring 1. For example, the auxiliary chamber may be a piston chamber housing a piston configured to compress the fluid (hydraulic medium) within the body 3, the piston being impelled using an elastic member such as a spring.

In general, the seal formed by inflating the body 3 is able to prevent fluid (such as gas or liquid) from passing between the flanges 15A, B in a radial direction, although other geometries can also be used. For example, a sealing ring similar to metal sealing ring 1 can be used to form a seal between a pair of nested cylinders or tubes. In this case, the metal sealing ring is provided in a channel formed in the end of one of the cylinders and inflated against the other cylinder after the cylinders have been nested, i.e. the sealing ring expands radially. This geometry allows two pipes to be sealingly joined together, for example.

Figure 3A:
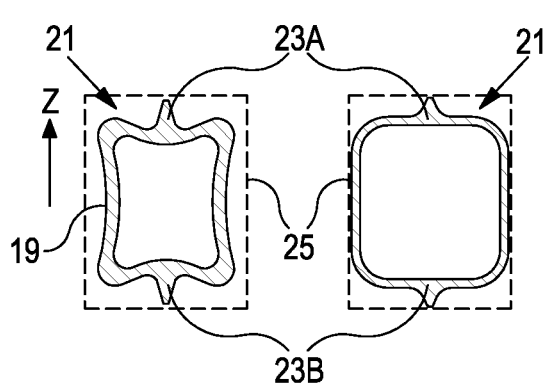
FIGS. 3A and 3B are schematic cross section views of the body of a metal sealing ring before and after inflation.
Figure 3B:
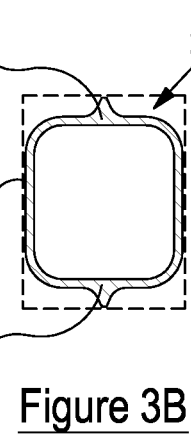

The examples described above have involved the use of a sealing ring with a circular cross section for ease of explanation. In some circumstances, other cross sections may have additional benefits to the integrity of the seal obtained. FIG. 3A shows a cross section 19 of the body of a metal sealing ring 21 prior to inflation. The vertical arrow in the figure (labelled as "z") indicates the direction of the axis of the metal sealing ring 21. The cross section 19 comprises two sharp (i.e. pointed) ridges 23A-B arranged on opposing axial faces of the ring 21. As shown in FIGS. 1 and 2, the body of the metal sealing ring 21 is enclosed within a cavity 25 (indicated in FIGS. 3A and 3B by a broken outline) formed by channels in the metal surfaces which are to be sealed. FIG. 3B is identical to FIG. 3A, except that the body of the metal sealing ring 21 has been inflated and deformed through the introduction of an internal pressure into the body using an inlet tube of the metal sealing ring 21. The cross section 25 is deformed to conform to the cavity 25 and the apex of each of the ridges 23A-B is driven into an opposing metal surface of the cavity to form a knife-edge seal.

In another example (not shown), the metal surfaces (flanges) being sealed each comprise a sharpened knife-edge or knife-edges. When the metal sealing ring is inflated, the knife-edges bite into the outer surface of the metal sealing ring to form a seal. In some cases, the outer surface of the metal sealing ring comprises one or more notches for receiving the knife-edge(s) in order to provide a stronger seal. In some examples, the characteristic dimensions of the knife-edges are much smaller than the thickness (i.e. minor radius) of the ring, to provide a textured (i.e. rough) surface for biting into the outer surface of the ring.

Figure 4A:
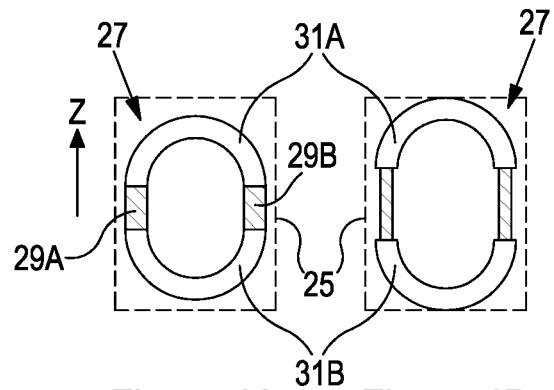
FIGS. 4A and 4B schematic cross section views of the body of metal sealing ring before and after inflation.
Figure 4B:
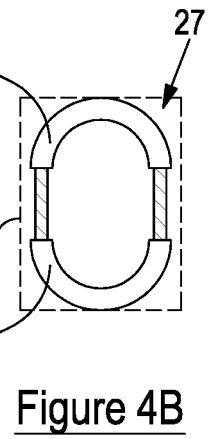

FIGS. 4A and 4B are similar to FIGS. 3A and 3B, except that the metal sealing ring 21 is replaced by metal sealing ring 27, which has a body cross section which is generally circular or elliptical and comprised of sections 29A-B, 31A-B made of different metals (or alloys). In this example, a pair of the sections 29A-B is made of a relatively more ductile metal, such as copper, and arranged along a radius of the sealing ring 27, whilst another pair of the sections 31A-B is made of a relatively less ductile metal, such as steel, and arranged axially with respect to the sealing ring 27. The sections 29A-B, 31A-B are joined together by welds, for example, although other ways of joining the sections together, such as brazing or soldering, can also be used. After inflation, the less ductile sections 31A-B remain substantially the same shape, whilst the more ductile sections 29A-B are stretched along the axial direction to force the less ductile sections 31A-B into contact with the metal surfaces of the cavity 25 and thereby form a seal between them. The interior pressure needed to inflate the sealing ring 27 can be controlled by varying the thickness of the less ductile sections 29A-B, with thinner sections being used for applications which require a relatively low internal pressure, e.g. when the sealing ring 27 has a large diameter or when only low internal pressures can be generated.

FIGS. 5A and 5B, are again similar to FIGS. 3A and 3B, except that the metal sealing ring 33 has a body with a hollow circular cross section 34 with a nib 35 which forms a sharpened ridge running around one face of the ring 33. In this example, the nib 35 is made of steel (although other relatively hard metals could also be used), whilst the rest 34 of the body is made of copper (although other relatively soft metals could be used). The nib 35 is typically attached to the body by welding, although other methods of attachment can be used, such as brazing, soldering or mechanically trapping the nib in place by, for example, co-extrusion or swaging. The cavity 36 enclosing the metal ring 33 in this example has a different shape from that of FIGS. 3A and 3B: it has a smaller section for accommodating the nib 35 after the metal sealing ring 33 is inflated/expanded. The nib 35 "bites" into the adjacent metal surface to form a "knife-edge" seal, whilst the circular cross section 34 also forms a seal by expanding to conform to the larger section of the cavity 36.

FIGS. 6A and 6B are again similar to FIGS. 3A and 3B, except that the metal sealing ring 37 comprises an interior wall 38 which divides the interior of the body into two chambers 39A, 39B. The dividing wall 38 is initially buckled (bent) towards the first chamber 39A. On introduction of the internal pressure into the first chamber 39A using the inlet tube 7, the dividing wall 38 moves towards the second chamber 39B and becomes straighter. This movement results in the outer walls of the body of the sealing ring 37 being forced apart, causing the body to deform against the metal surfaces 40A, 40B to form the seal (see FIG. 6B). In this example, the second chamber 39B comprises a strut 41 which opposes further movement of the dividing wall 38 after it has been straightened to avoid the dividing wall 38 from buckling (bending) in the opposite direction (i.e. into the second chamber 39B).

The strut 38 may be elastically compressible in order to maintain the internal pressure in the first chamber 39A and hence the sealing pressure exerted on the metal surfaces 40A, 40B by the outer walls of the body. The second chamber 39B may also be pressurised in order to increase the pressure that must be introduced into first chamber 39A to move the dividing wall 38 and thereby increase the sealing pressure.

Alternatively or additionally, the dividing wall 38 may be moved by reducing the pressure in the second chamber 39B (e.g. using a vacuum pump) to create a pressure differential between the chambers 39A, 39B. Conversely, the movement of the dividing wall 38 towards the second chamber 39B may be reversed by introducing an internal pressure into the second chamber 39B to create a pressure differential in the opposite direction. This allows the seal to be released by "deflating" the metal sealing ring 37.

Another way in which the seal may be released is to dissolve or chemically react away some (or all) of the metal sealing ring 1, 21, 27, 33, 37. For example, the body of the metal sealing ring may be made of copper which is plated (on the outside) with gold. The copper may be dissolved using a solvent (for example, iron III chloride), introduced into the sealing ring through the inlet tube 7 (for example) to leave a layer of gold which allows the seal to be easily removed and the mating parts to be separated from one another. Of course, other material combinations and/or solvents can also be used.

Figure 7:
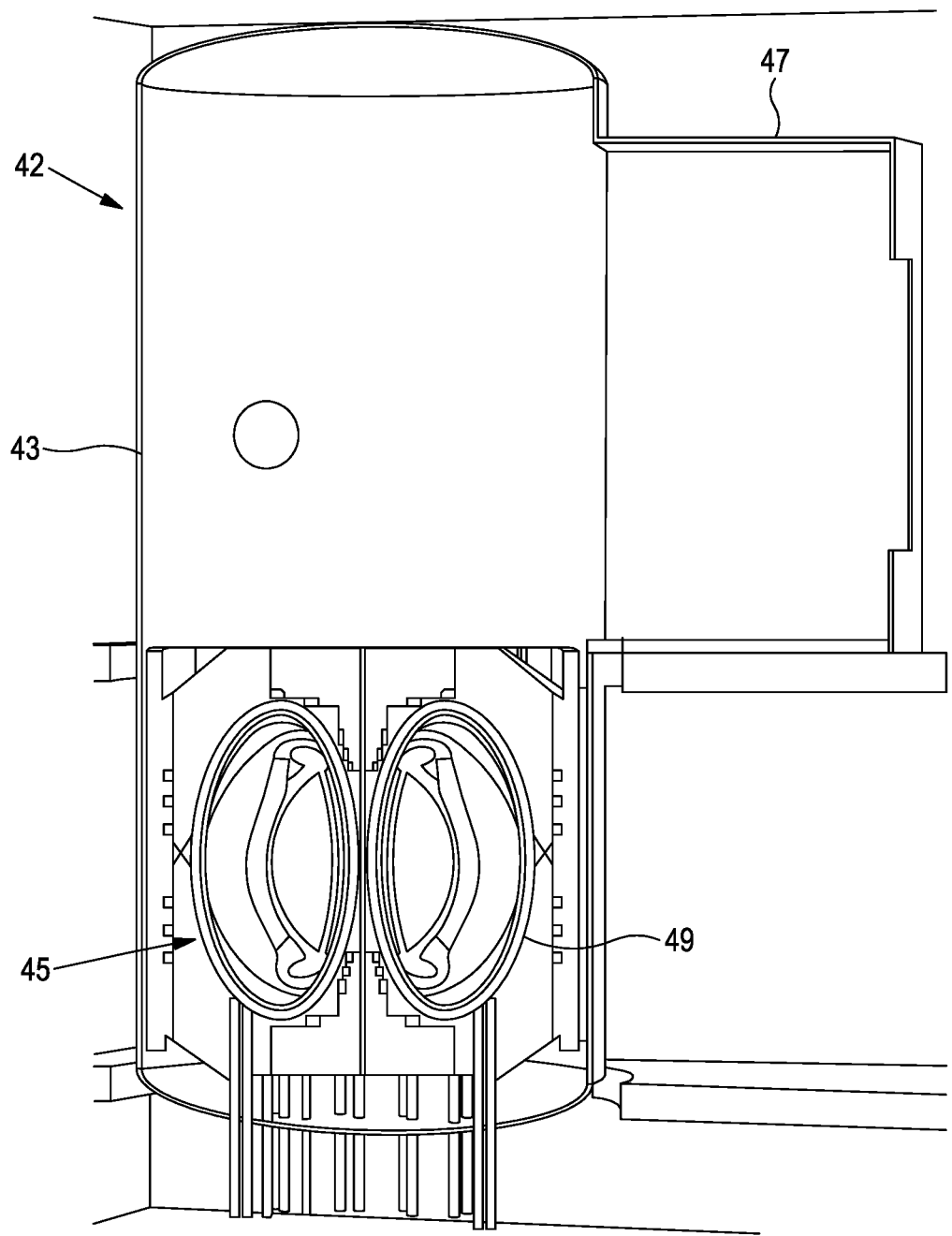
FIGS. 7 and 8 are schematic cross section views of a vacuum system comprising a tokamak fusion reactor.
Figure 8:
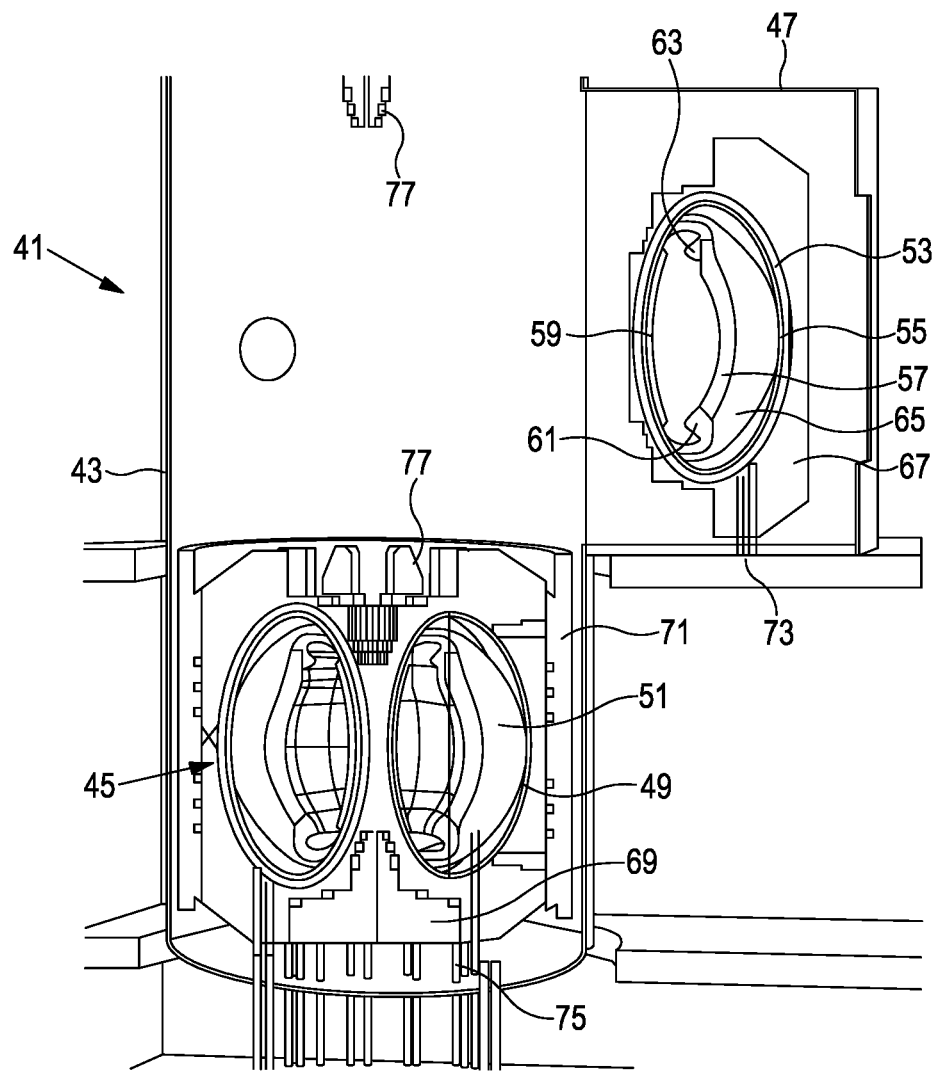

The metal sealing rings 1, 21, 27, 33, 37 described above may be used in a variety of applications. For example, one or more of the metal sealing rings described above may be used in a head gasket to seal a cylinder head to an engine block in a piston engine. As another example, one or more of the metal sealing rings described above may be included in a piston device comprising a piston head that slides within a cylinder against (or in response to) a fluid pressure acting on the piston head. In this case, the metal sealing ring can be used to form a seal between the piston head and the cylinder, or between the cylinder and a connecting rod attached to or integral with the piston head. One or more such pistons may be used in a plasma compression device. The plasma compression device may be, for example, a fusion reactor comprising a chamber containing a liquid metal vortex into which a plasma is injected. The pistons are configured to drive the liquid metal towards the centre of the chamber, thereby collapsing the vortex and compressing the plasma to start a fusion reaction. FIGS. 7 and 8 show a vacuum system 42 comprising an outer vacuum chamber 43, a tokamak 45 (i.e. a toroidal fusion reactor for controlling fusion reactions in magnetically confined hot plasma) and a maintenance vacuum chamber 47. The outer vacuum chamber 43 encloses the tokamak 45 and is connected to the maintenance vacuum chamber 47 as described below. In one particular embodiment, the tokamak 45 has height of approximately 5 to 15 m and the outer vacuum chamber has a height of approximately 20 to 30 m, although in general the height of the outer vacuum is around 2-2.5 times the height of the tokamak 45. The outer vacuum chamber 43 and the maintenance vacuum chamber 45 together enclose the components of the tokamak 45 so as to prevent tritium and other radioisotopes from escaping.

The tokamak 45 comprises an inner vacuum chamber 49 with a toroidal interior volume 51 in which to confine plasma. As can be most clearly seen in FIG. 8, the inner vacuum chamber 49 is formed from a plurality of independently removable segments 53, with each segment 53 providing a sector (i.e. a tapered angular piece) of the inner vacuum chamber 49. For example, each segment may span an angle of 22.5 degrees such that the inner vacuum chamber 49 is formed from 16 segments (although it is not necessary that the segments each span the same size of angle, and any number of segments could be used). Each segment 53 comprises a toroidal field (TF) coil 55 which encircles the interior volume of the segment such that, when the inner vacuum chamber is fully assembled and current is supplied to the coils 55, a toroidal magnetic field is generated within the inner vacuum chamber 49. In this case, the toroidal field coil 55 is mounted to the inside walls of the segment 53 and follows the generally elliptical cross-section of the segment 53.

Each segment 53 houses a segment of the "first wall" 57 of the tokamak 45, i.e. a wall which is directly adjacent to the plasma when the tokamak 45 is in use. Whilst most of the first wall segment 57 is located towards the radially outermost wall of the inner vacuum chamber segment 53, there is an inner section 59 of the first wall segment 57 which is located on the radially innermost wall of the inner vacuum chamber segment 53. A pair of divertors 61, 63 are provided between the radially outer and inner sections of the of the first wall segment 57 in order to capture plasma escaping axially from the magnetic fields of the tokamak 45 during operation of the tokamak 45. One divertor 61 is provided on the bottom wall of the segment 53 and the other divertor 63 is provided on the top wall of the segment 53 (here top and bottom are used with reference to FIG. 7, in which the axis of the segment 53, i.e. the axis of the toroidal inner volume, is vertical). The first wall segment 57 and divertors 61, 63 are surrounded within segment 53 by shielding 65 to limit the flux of neutrons leaving the tokamak 45.

Each segment 53 is mounted within an in-plane support structure 67 (or "carrier") which supports the segments 53 when they are assembled to form the inner vacuum chamber 49. The frame comprises a central support 69 for supporting the underside of the in-plane support structure 67 close to the axis of the tokamak 45 and support columns 71 arranged around the outside of the tokamak 45 for supporting each in-plane support structure 67 along its radial edge. The in-plane support structure 67 comprises couplings 73 in its base for supplying cryogenic coolant (typically at a temperature of around 20 to 30 K) to the segment 53, electrical current to the TF coil 55, coolant to the shielding 65 and cooling to the first wall segment 57. When the tokamak 45 is assembled, the couplings are connected to complementary feedthroughs 75 provided in the base of the outer vacuum chamber 43 in order for coolants and power to be supplied to each segment 53.

In FIG. 8, one of the segments 53 has been moved from the outer vacuum chamber 43 into the maintenance chamber 47 (as indicated by the fainter lines on the right-hand side the tokamak 45), e.g. using a robotic handling system (not shown) located inside the outer vacuum chamber 42. In this example, the dimensions of the maintenance chamber 47 are chosen such that a single segment 53 can be accommodated, thereby allowing access to the faces of the segment 53 for inspection and/or maintenance, e.g. using another robotic system. In some examples, an isolation valve, such as a gate valve (not shown) is provided to allow the maintenance chamber 47 and the outer vacuum chamber 43 to be isolated from one another, e.g. so that the maintenance chamber 47 can be brought up to atmospheric pressure to allow parts of the segment 53 (or even the whole segment 53) to be removed and replaced.

In order for the inner vacuum chamber 49 to be re-assembled, e.g. once the segment 53 has been repaired, a vacuum seal needs to be formed between the segment 53 and the adjoining segments on either side of the segment 53. However, the segments 53 are required to fit closely together to form the inner vacuum chamber 49 and are, in general, clamped firmly in place by the frame 69, 70, which means that seals which rely on the compression of a sealing ring (e.g. conflat seals) may not be suitable. A solution to this problem is provided by the metal sealing rings 1, 21, 27, 33 described above, which can be located between the segments 53 and inflated to form the required seal. The use of a metal-to-metal seal between the segments 53 is particularly important in order to prevent tritium from leaking from the tokamak 45.

Each segment may comprise a groove or channel in which to seat the sealing ring 1, 21, 27, 33 such that it is flush with (or recessed into) the face of the segment 53 prior to inflation. Such an arrangement allows the segments 53 to be a close-fit to one another once assembled (e.g. separated by less than 5 mm), which minimises the size of the gaps between the respective first wall segments 57, divertors 61, 63 and shielding 65 housed in each segment 53.

Additionally or alternatively, the shielding 65 may be fixed to a compliant mounting (not shown) which provides the shielding with some freedom of movement when the segment 53 is moved radially into the vacuum chamber 53 during assembly. This freedom allows the shielding 65 to fit tightly into place without hindering the insertion of the segment 53.

Alternatively, the metal sealing ring 1, 21, 27, 33 may be mounted on a removable carrier (not shown), which is inserted between adjacent segments 53 and then removed after the sealing ring has been inflated to form the seal. An advantage of this approach is that neither of the segments 53 requires a groove, which means that the sealing ring and the segments 53 can each be slid into place prior to forming the seal, e.g. slid vertically (axially) into position from above the tokamak 45. This configuration therefore allows the segments 53 to be individually removed and replaced without requiring the neighbouring segments 53 to be moved.

Poloidal field (PF) coils (not shown) are provided above and below the inner vacuum chamber 49, to provide a poloidal magnetic field within the inner vacuum chamber 49 when the tokamak 45 is operated. Unlike the TF coils 55, the PF coils are not required to be segmented, because the upper PF coils can be lifted from the tokamak 45 to allow a segment 53 to be removed, whilst the lower PF coils can remain in place below the inner vacuum chamber 49 between the in-plane support structure 67 and the central support 69.

When the inner vacuum chamber 49 is assembled (see FIG. 7) the in-plane support structures 67 are clamped in place by a capping structure 77 which lies on the axis (central column) of the tokamak 45 and can be raised to the top of the outer vacuum chamber 43 to allow the segments 53 to be removed or replaced.

The invention claimed is:

1. A method of forming a metal-to-metal seal between two opposing metal surfaces using a metal sealing ring comprising a tubular metal body and an inlet tube extending from the body for introducing an internal pressure into the body, the method comprising locating the body of the metal sealing ring between the metal surfaces and using the inlet tube to introduce an internal pressure into the body to deform the body against the metal surfaces to form the seal, wherein the body is plastically deformed such that the internal pressure in the body can be relieved without breaking the seal.

2. A method according to claim 1, wherein the internal pressure is introduced into the body by forcing a fluid, such as a hydraulic fluid, into the body from the inlet tube.

3. A method according to claim 2, wherein forcing the fluid into the body from the inlet tube comprises crimping the inlet tube.

4. A method according to claim 1, wherein the internal pressure is created by introducing a liquid or solid into the inlet tube, sealing the inlet tube, and then allowing or causing the liquid or solid to vaporise or sublime.

5. A method according to claim 1, further comprising releasing the seal by dissolving or chemically reacting away some or all of the metal sealing ring.

6. A method according to claim 1, wherein the body of the metal sealing ring is made of copper which is plated on the outside with gold, the method further comprising dissolving the copper with a solvent to leave a layer of gold.

7. A method according to claim 1, wherein the internal pressure is introduced into metal sealing ring by moving a piston surface within the interior volume of the inlet tube.

8. A method according to claim 7, wherein the piston surface is provided by or movable using a screw.

9. A method according to claim 1, wherein the interior of the body is divided into first and second chambers by a dividing wall and the dividing wall moves towards the second chamber in response to the internal pressure being introduced into the first chamber using the inlet tube and thereby causes expansion of the body against each of the opposing metal surfaces.

10. A method according to claim 9, wherein the second chamber comprises a strut that opposes the movement of the dividing wall.

11. A method according to claim 10, wherein the strut is elastically compressed to provide an elastic restoring force on the dividing wall.

12. A tokamak comprising a vacuum chamber having a toroidal interior volume, the vacuum chamber comprising a plurality of segments, each segment providing a sector of the toroidal interior volume and comprising one or more toroidal field coils wound around the segment for generating a toroidal magnetic field within the sector, the vacuum chamber further comprising a seal formed between at least two of the segments using the method of claim 1.

13. A tokamak according to claim 12, wherein each segment is individually removable from the vacuum chamber.

14. A seal between two opposing metal surfaces formed using the method of claim 1.

15. A vacuum chamber comprising one or more seals according to claim 14.

* * * * *